US009538030B2

(12) United States Patent
Xie

(10) Patent No.: US 9,538,030 B2
(45) Date of Patent: Jan. 3, 2017

(54) IMAGE READING APPARATUS

(71) Applicant: Brother Kogyo Kabushiki Kaisha, Nagoya-shi, Aichi-ken (JP)

(72) Inventor: Tianjin Xie, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/868,621

(22) Filed: Sep. 29, 2015

(65) Prior Publication Data

US 2016/0094739 A1 Mar. 31, 2016

(30) Foreign Application Priority Data

Sep. 29, 2014 (JP) ................................ 2014-198844

(51) Int. Cl.
  *H04N 1/04* (2006.01)
  *H04N 1/00* (2006.01)
  *H04N 1/10* (2006.01)

(52) U.S. Cl.
  CPC ...... *H04N 1/00525* (2013.01); *H04N 1/00557* (2013.01); *H04N 1/1061* (2013.01)

(58) Field of Classification Search
  CPC ............ H04N 1/00525; H04N 1/00557; H04N 1/1061
  USPC ................. 358/474, 498, 497, 496
  See application file for complete search history.

(56) References Cited

U.S. PATENT DOCUMENTS 8,724,181 B2   5/2014  Fujiwara
2012/0026558 A1  2/2012  Fujiwara

FOREIGN PATENT DOCUMENTS

JP    2012-034106 A    2/2012
JP       5264215 B2    8/2013
KR    2001-0095193  * 11/2001  .............. H04N 1/04

* cited by examiner

*Primary Examiner* — Houshang Safaipour
(74) *Attorney, Agent, or Firm* — Banner & Witcoff, Ltd.

(57) ABSTRACT

An image reading apparatus includes a scanner housing, a document support member supported by the scanner housing, a reader configured to read an image of a document supported on a document support surface of the document support member, a movable member holding the reader, and a flat cable connected to the reader at one end. The scanner housing includes a peripheral wall including a particular wall. The particular wall includes a restricting portion protruding from the particular wall in a first direction parallel to the document support surface such that the restricting portion restricts the facing surface of the flat cable from contacting the flat surface of the document support member by contacting an outer portion of the facing surface of the flat cable. The restricting portion includes a restricting surface located closer to a bottom wall surface of the scanner housing than the document support member.

19 Claims, 11 Drawing Sheets

IMAGE READING APPARATUS

CROSS-REFERENCE TO RELATED APPLICATION

This application claims priority from Japanese Patent Application No. 2014-198844 filed on Sep. 29, 2014, the content of which is incorporated herein by reference in its entirety.

FIELD OF DISCLOSURE

The disclosure relates to an image reading apparatus.

BACKGROUND

A known image reading apparatus includes a scanner housing, a contact glass, an image sensor, and a flat cable.

The scanner housing mainly includes a bottom wall surface, a peripheral wall, and a frame. The peripheral wall protrudes upward from the bottom wall surface. The peripheral wall defines an accommodation area thereinside. The frame faces an upper end of the peripheral wall, and extends substantially parallel to the bottom wall surface with a predetermined distance therebetween. The frame has a rectangular opening formed in a central portion of the frame. The contact glass is supported by the scanner housing, covering the accommodation area from above. The contact glass is exposed through the opening of the frame. A lower surface of the contact glass faces the bottom wall surface. An upper surface of the contact glass constitutes a document support surface.

The image sensor is disposed inside the accommodation area. The image sensor extends in a first direction parallel to the document support surface. The image sensor is configured to reciprocate, inside the accommodation area, in a second direction orthogonal to the first direction and parallel to the document support surface. One end of the flat cable is held by the bottom wall surface of the scanner housing and the other end of the flat cable is coupled to the image sensor. The flat cable has a portion that faces the lower surface of the contact glass between the one end and the other end.

In the image reading apparatus, the image sensor is configured to read an image on a document supported by the document support surface while reciprocating in the second direction. At this time, the flat cable follows the reciprocating movement of the image sensor in the second direction, and does not get in the way of an image reading operation by the image sensor.

SUMMARY

Reduction of a physical size of the image reading apparatus may be desired. In the known image reading apparatus, for example, the flat cable is routed such that one edge of the flat cable, in a width direction thereof parallel to the first direction, extends in the second direction and is disposed along a portion of a peripheral wall, and the other edge of the flat cable in the width direction is disposed overlapping in the top-bottom direction with a portion of the frame. In other words, the flat cable is disposed without overlapping in the top-bottom direction with a portion of the contact glass exposed through the opening of the frame. However, if a size of the scanner housing in the first direction is reduced to reduce the size of the image reading apparatus in the first direction, the flat cable would be routed with the other end of the flat cable in the width direction protruding to a position where the other end faces the lower surface of the contact glass beyond the portion of the frame in the first direction.

In this case, the size of the image reading apparatus in the first direction may be reduced as the portion of the frame facing the peripheral wall along which the one edge of the flat cable is disposed is reduced with respect to the first direction. However, the following problems may occur.

For example, when the flat cable follows the reciprocating movement of the image sensor, the flat cable deforms upward, so that the flat cable may readily contact the lower surface of the contact glass. Dust on the flat cable may possibly adhere to the lower surface of the contact glass as dirt. The dirt may be recognized by a user, leading to deterioration of appearance quality of the image reading apparatus.

One or more aspects of the disclosure are to provide an image reading apparatus that may realize a reduction in size of the image reading apparatus and that may prevent or reduce deterioration of appearance quality of the image reading apparatus due to dust or dirt on a document support member of the apparatus.

According to an aspect of the disclosure, an image reading apparatus includes a scanner housing, a document support member supported by the scanner housing, a reader, a movable member, and a flat cable. The scanner housing includes a bottom wall surface, a frame spaced from and extending substantially parallel to the bottom wall surface, the frame having an inner peripheral edge, and a peripheral wall protruding from both of the bottom all surface and the frame and defining, with the bottom wall surface and the frame, an accommodation area within the scanner housing. The document support member covers the accommodation area. The document support member has a flat surface and a document support surface opposite to the flat surface. The flat surface face the bottom wall surface of the scanner housing at least inside the inner peripheral edge of the frame. The document support member is configured to support a document on the document support surface. The reader is disposed in the accommodation area defined within the scanner housing and extends in a first direction parallel to the document support surface. The reader is configured to read an image of a document supported on the document support surface. The movable member holds the reader and is configured to reciprocate in the accommodation area defined within the scanner housing in a second direction orthogonal to the first direction and parallel to the document support surface. The flat cable is connected to the reader at one end, and has a facing surface facing the flat surface of the document support member. The peripheral wall of the scanner housing includes a particular wall extending in the second direction and a third direction orthogonal to the document support surface and defining one side of the accommodation area. The facing surface of the flat cable has a first edge and a second edge opposite to the first edge in the first direction. The first edge is disposed along the particular wall extending in the second direction. The second edge is located overlapping the document support member inside the inner peripheral edge of the frame of the scanner housing when viewed in the third direction. The particular wall of the peripheral wall of the scanner housing includes a restricting portion protruding from the particular wall in the first direction. The restricting portion is located between the frame of the scanner housing and the first edge of the facing surface of the flat cable in the third direction such that the restricting portion restricts the facing surface of the flat cable from contacting the flat surface of the document support member by contacting an outer portion, closer to the first edge than to the second edge, of the facing surface of the flat cable. The restricting portion protruding from the particular wall in the first direction includes a restricting surface located closer to the bottom wall surface of the scanner housing than the flat surface of the document support member. The restricting surface extends substantially parallel to the flat surface of the document support member such that, when the movable member reciprocates in the second direction, the outer portion of the facing surface of the flat cable contacts the restricting surface.

In the image reading apparatus, the first edge is disposed along the particular wall extending in the second direction. The second edge is located overlapping the document support member inside the inner peripheral edge of the frame of the scanner housing when viewed in the third direction orthogonal to the document support surface. Thus, in the image reading apparatus, a dimension of a portion of the frame adjacent, in the first direction, to the particular wall can be reduced.

In the image reading apparatus, the particular wall includes the restricting portion. The restricting portion protrudes from the particular wall in the first direction and the restricting portion is located between the frame and the first edge of the facing surface of the flat cable. The restricting portion includes the restricting surface. The restricting surface is located closer to the bottom wall surface than the flat surface of the document support member and extends substantially parallel to the flat surface. The restricting portion as structured above is configured to restrict the facing surface of the flat cable from contacting the flat surface of the document support member by contacting an outer portion, closer to the first edge than to the second edge, of the facing surface of the flat cable. More specifically, even when a position of the facing surface changes as the flat cable follows the reciprocating movement of the movable member, the restricting surface contacts the outer portion of the facing surface of the flat cable, so as to prevent the facing surface from contacting the flat surface of the document support member. Therefore, an inner portion, closer to the second edge than to the first edge, of the facing surface may be difficult to contact the flat surface of the document support member inside the inner peripheral edge of the frame. Consequently, dust adhered to the inner portion of the facing surface may be difficult to adhere to the flat surface as contaminants.

Thus, the image reading apparatus can realize a reduction in size of the image reading apparatus and prevent or reduce deterioration of appearance quality of the image reading apparatus due to dust or dirt on the document support member.

According to another aspect of the disclosure, an image reading apparatus includes a glass which is flat, a scanner housing holing the glass, a reader, a movable member, and a flat cable. The scanner housing includes a frame extending substantially parallel to the glass and having an inner peripheral edge, a particular surface spaced apart from and extending substantially parallel to the frame, and a peripheral wall defining an accommodation area. The reader is disposed in the accommodation area of the scanner housing and extends in a first direction parallel to the glass. The reader is configured to read an image of a document on the glass. The movable member holds the reader and is configured to reciprocate in the accommodation area of the scanner housing in a second direction orthogonal to the first direction and parallel to the glass. The flat cable is connected to the reader at one end, and has a facing surface facing the glass. The peripheral wall of the scanner housing includes a particular wall extending in the second direction and a third direction orthogonal to the glass and defining one side of the accommodation area. The facing surface of the flat cable has a first edge and a second edge opposite to the first edge in the first direction. The first edge is disposed along the particular wall extending in the second direction. The second edge is located overlapping the glass inside the inner peripheral edge of the frame of the scanner housing when viewed in the third direction. The particular wall of the peripheral wall of the scanner housing includes a restricting portion. The restricting portion protrudes from the particular wall in the first direction such that the restricting portion restricts the facing surface of the flat cable from contacting the glass by contacting an outer portion, closer to the first edge than to the second edge, of the facing surface of the flat cable.

Thus, in the image reading apparatus, a dimension of a portion of the frame adjacent, in the first direction, to the particular wall can be reduced.

The particular wall includes the restricting portion. Although a position of the facing surface of the flat cable changes as the flat cable follows the reciprocating movement of the movable member, the restricting portion restricts the position of the facing surface of the flat cable from contacting the glass by contacting the outer portion of the facing surface of the flat cable. Consequently, dust adhered to an inner portion, closer to the second edge than to the first edge, of the facing surface may be difficult to adhere to the glass as contaminants.

Thus, the image reading apparatus can realize a reduction in size of the image reading apparatus and prevent or reduce deterioration of appearance quality of the image reading apparatus due to dust or dirt on the document support member.

DETAILED DESCRIPTION

Illustrative embodiments are described in detail herein with reference to the accompanying drawings.

Embodiment

Figure 1:
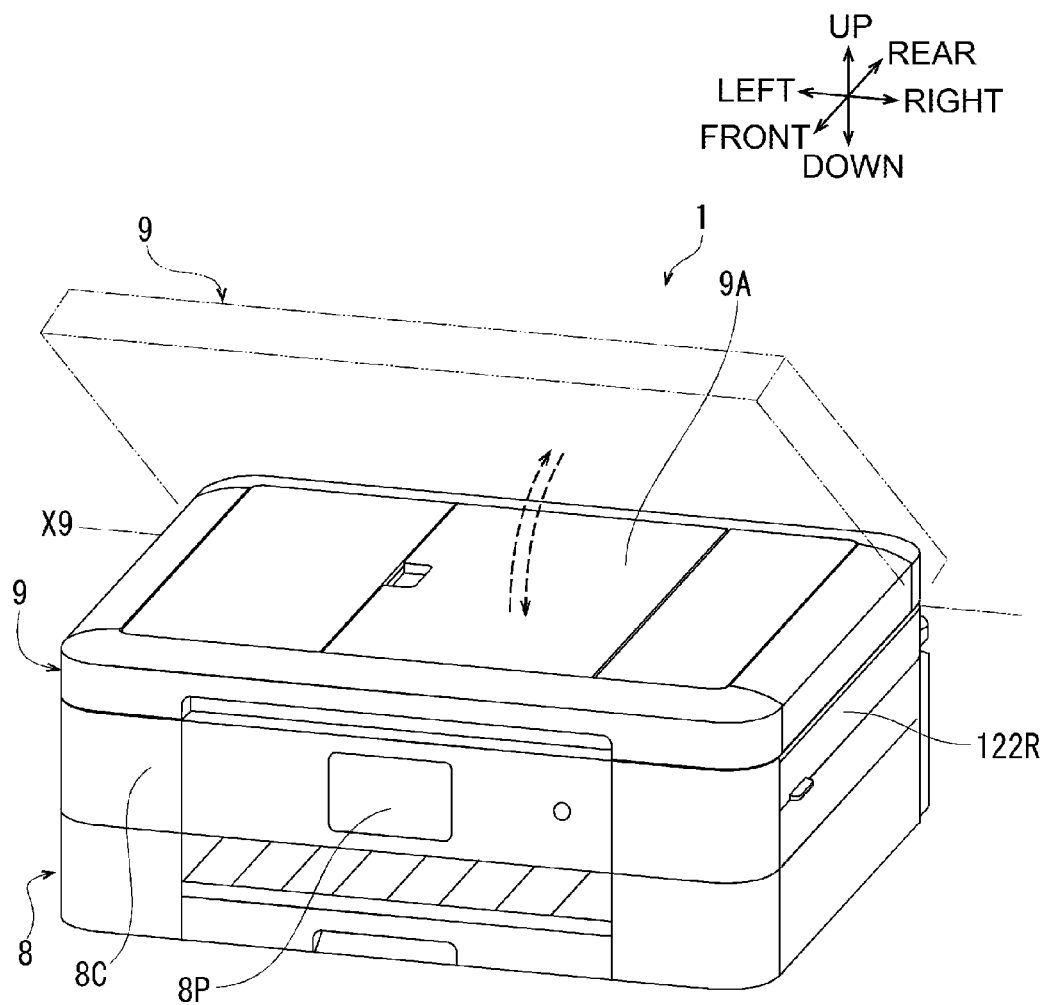
FIG. 1 is a perspective view of an image reading apparatus in an illustrative embodiment according to one or more aspects of the disclosure.

Aspects of the disclosure may be applied to an image reading apparatus 1 as depicted in FIG. 1. In FIG. 1, a side of the image reading apparatus 1 on which a control panel 8P is disposed is defined as a front side. Front, rear, left, right, top, and bottom sides of the image reading apparatus 1 are defined in conjunction with an orientation in which the image reading apparatus 1 is viewed from the front side. Labeling of the front, rear, left, right, top, and bottom sides in FIGS. 2-11 may correspond to the labeling of FIG. 1. Referring to FIG. 1, elements of the image reading apparatus 1 will be described.

<Structure>

Figure 2:
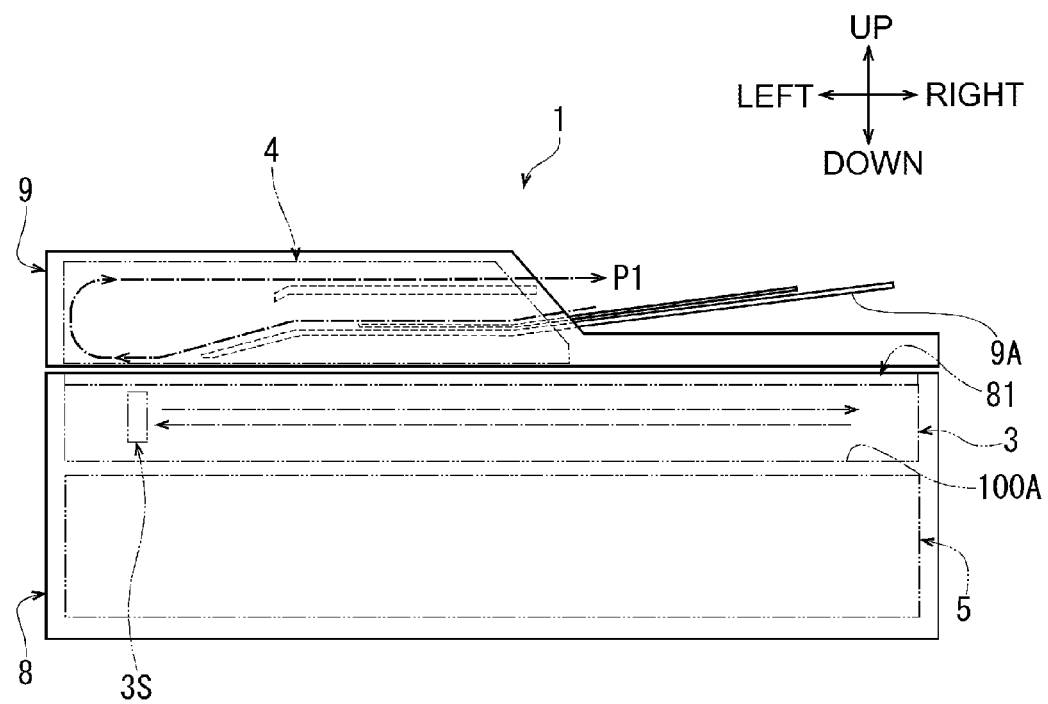
FIG. 2 is a schematic front side view of the image reading apparatus.

As depicted in FIGS. 1 and 2, the image reading apparatus 1 includes a main unit 8, an openable unit 9, an image forming unit 5, a reading unit 3, and a feeding unit 4. The main unit 8 has a generally flat box shape. As depicted in FIG. 1, the control panel 8P, e.g., a touch panel, is disposed on a front surface of the main unit 8.

As depicted in FIG. 2, the reading unit 3 is located at an upper portion of the main unit 8. The image forming unit 5 is accommodated in a lower portion of the main unit 8. The image forming unit 5 is configured to form an image on a sheet by an inkjet method or a laser-beam method.

As depicted in FIGS. 3-9, the reading unit 3 includes a scanner housing 100, a platen glass 81, a reading sensor 3S, a carriage 20, and a flat cable 50. The platen glass 81 is an example of a document support member. The reading sensor 3S is an example of a reader. The carriage 20 is an example of a movable member.

A front surface of the scanner housing 100 is covered by the control panel 8P and an outer cover 8C, as depicted in FIG. 1. As depicted in, for example, FIGS. 3 and 6, the platen glass 81 is disposed at an upper portion of the reading unit 3.

Figure 3:
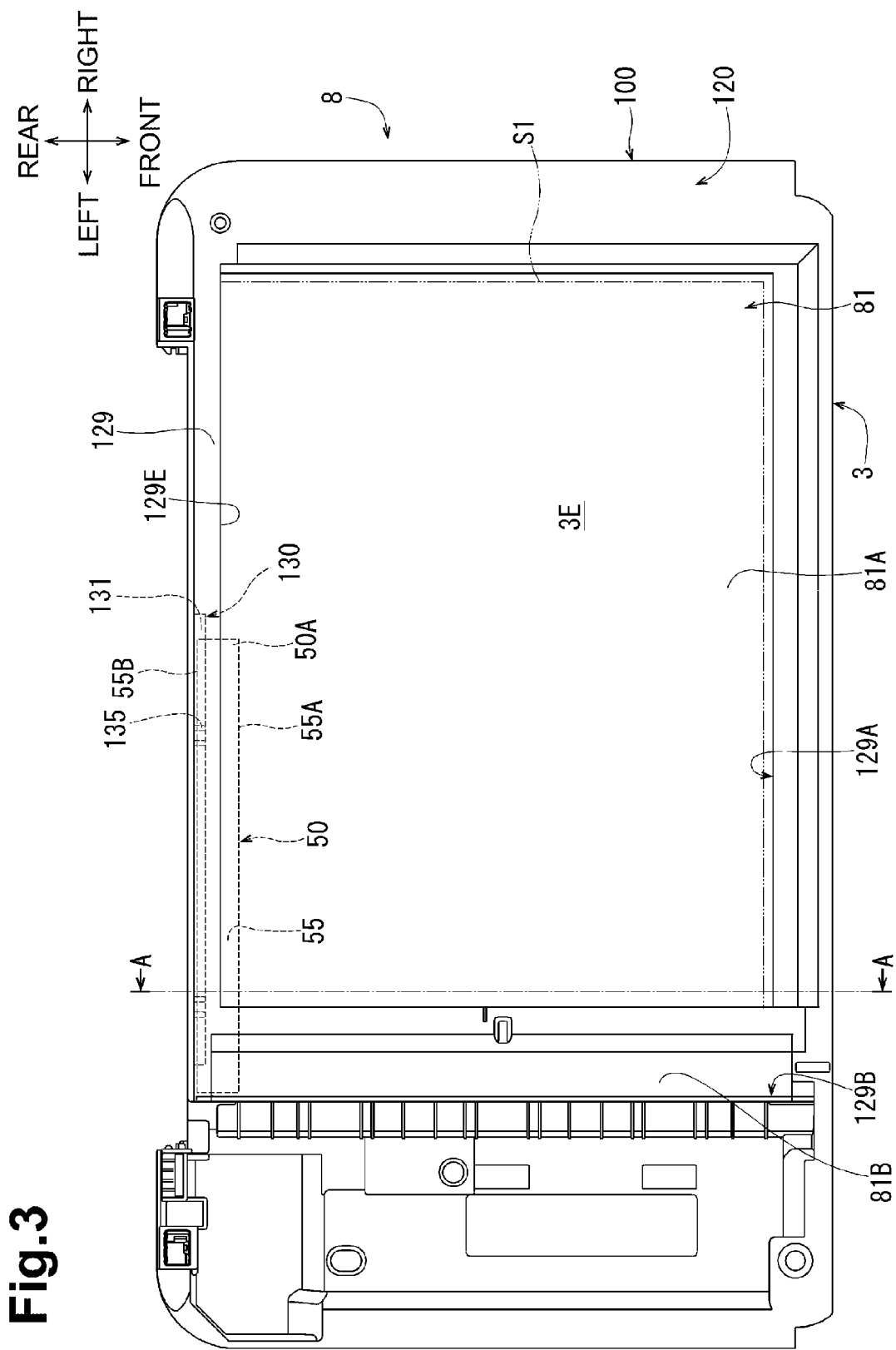
FIG. 3 is a top view of a scanner top and a supporting member.
Figure 4:
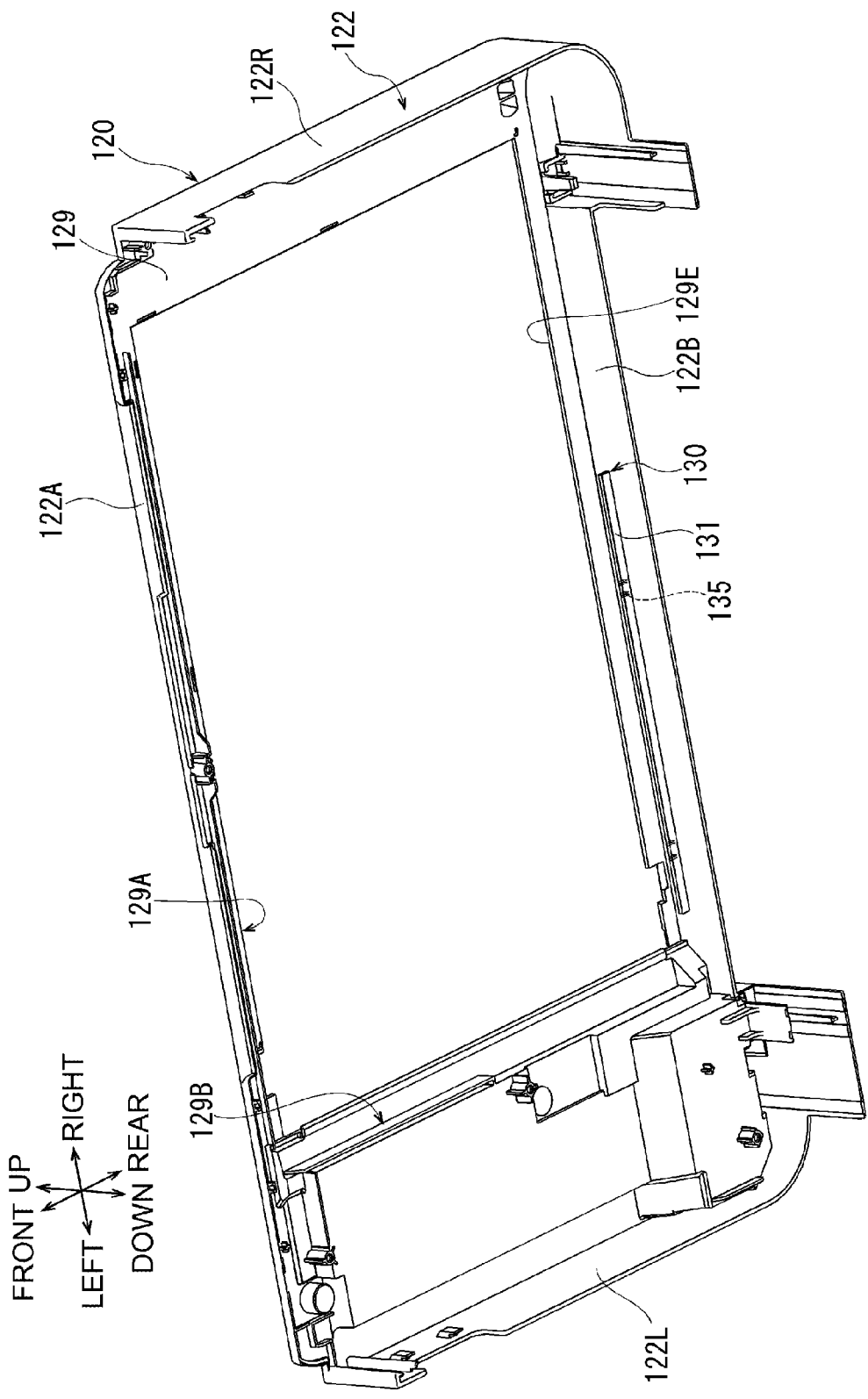
FIG. 4 is a perspective view of the scanner top as viewed from the bottom.
Figure 5:
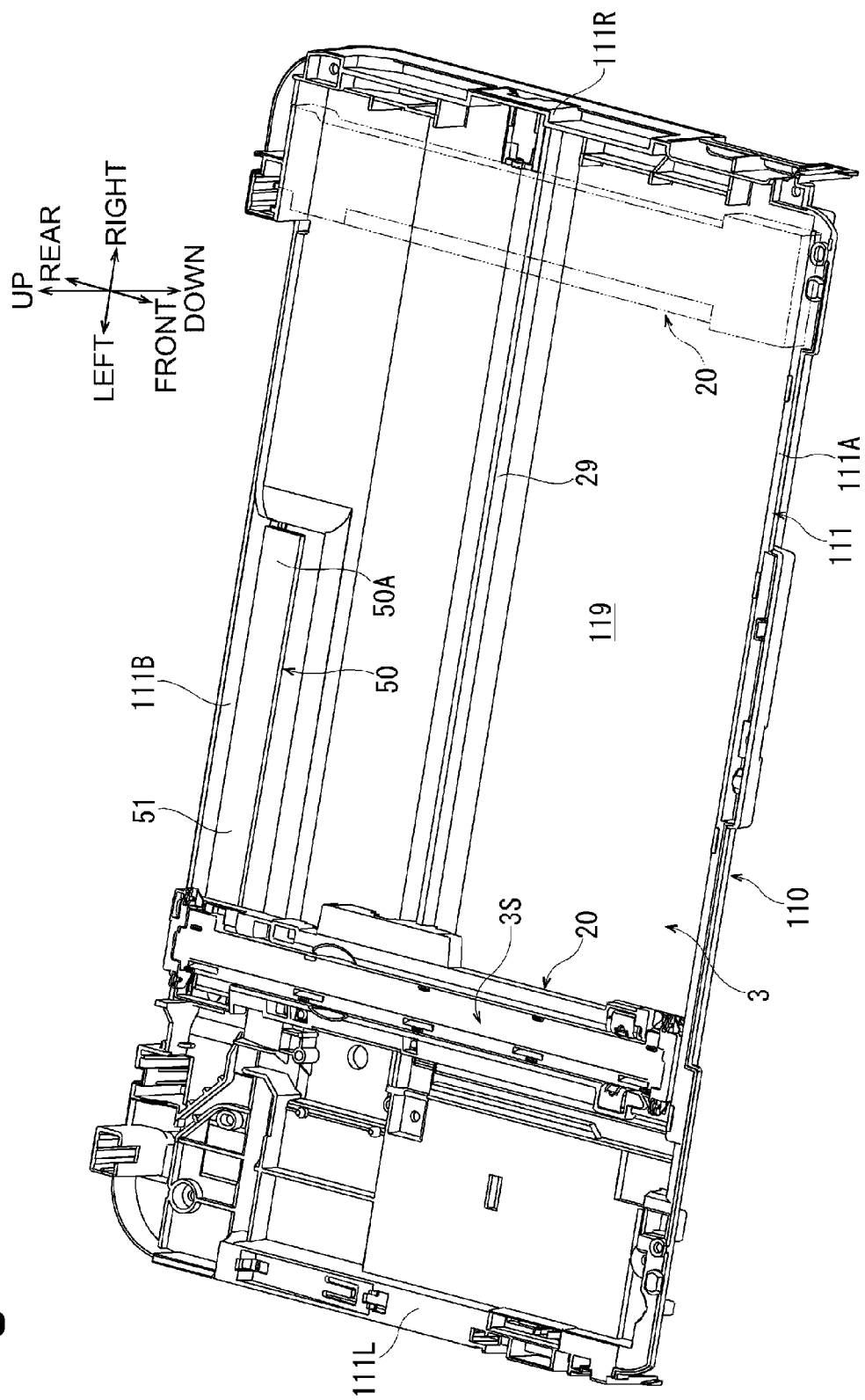
FIG. 5 is a perspective view of a scanner base, a reader, a movable member, and a flat cable.
Figure 6:
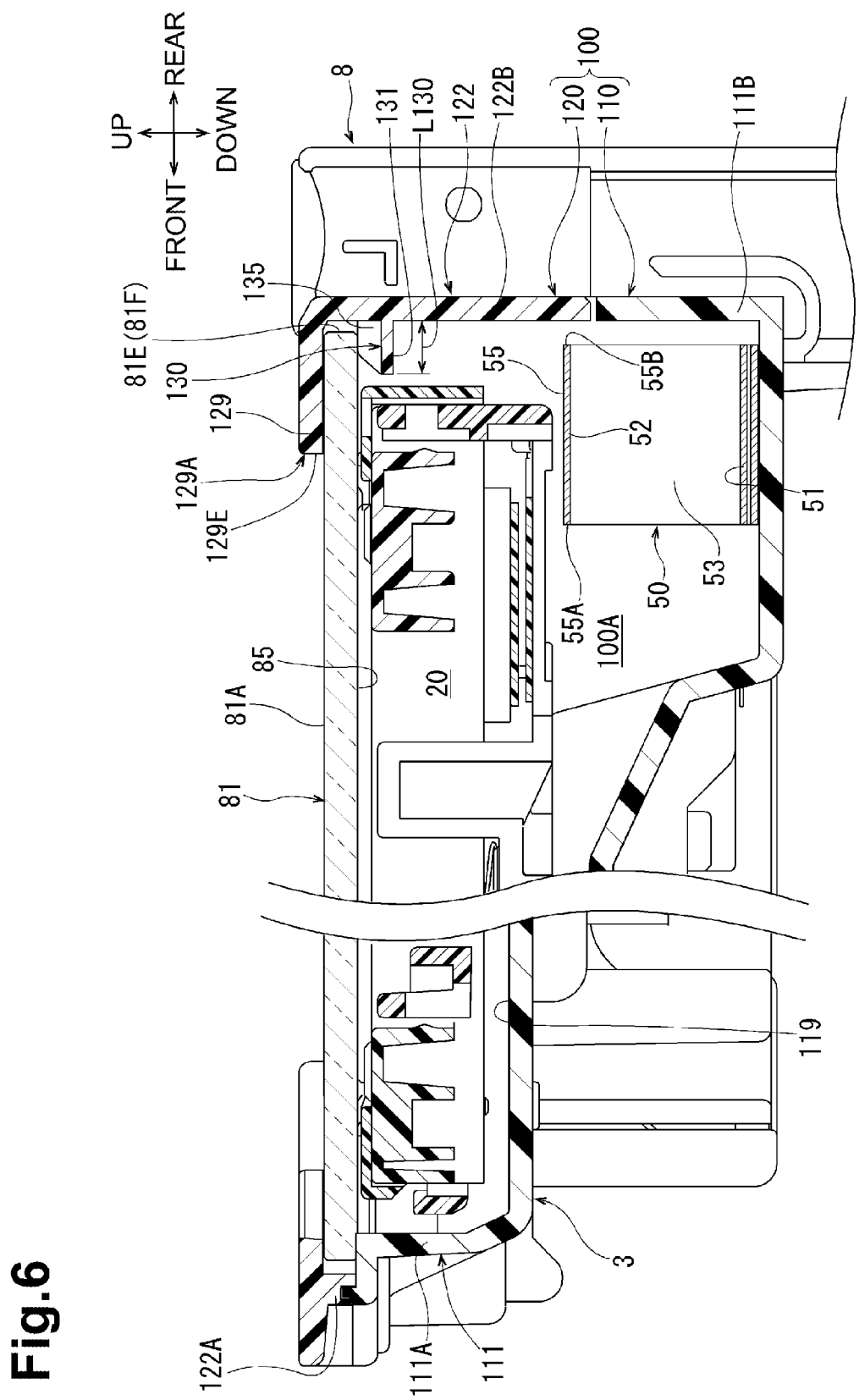
FIG. 6 is a partial sectional view of a scanner housing taken along a line A-A of FIG. 3.

The scanner housing 100 includes a scanner base 110 depicted in FIG. 5, and a scanner top 120 depicted in FIGS. 3 and 4. The scanner base 110 and the scanner top 120 are combined in the top-bottom direction, as depicted in FIG. 6. The scanner base 110 and the scanner top 120 are injection-molded with thermoplastic resin in the illustrative embodiment.

As depicted in FIG. 5, the scanner base 110 includes a bottom wall surface 119 and a first peripheral wall 111. The bottom wall surface 119 has a generally rectangular shape extending substantially horizontally. The first peripheral wall 111 includes a front wall 111A, a rear wall 111B, a left wall 111L, and a right wall 111R. The front wall 111A, the rear wall 111B, the left wall 111L and the right wall 111R protrude upward from front, rear, left, and right edges of the bottom wall surface 119, respectively.

As depicted in FIGS. 3 and 4, the scanner top 120 includes a frame 129 and a second peripheral wall 122. As depicted in FIG. 6, the frame 129 is located above the bottom wall surface 119 with a predetermined space therebetween. The frame 129 extends substantially parallel to the bottom wall surface 119. As depicted in FIGS. 3 and 6, the frame 129 is in contact with a peripheral edge portion 81E of the platen glass 81 from above. As depicted in FIG. 4, the second peripheral wall 122 includes a front wall 122A, a rear wall 122B, a left wall 122L, and a right wall 122R. The front wall 122A, the rear wall 122B, the left wall 122L, and the right wall 122R protrude downward from front, rear, left, and right edges of the frame 129, respectively.

As depicted in FIG. 6, as the scanner top 120 and the scanner base 110 are combined, a lower edge of the front wall 122A of the scanner top 120 contacts an upper edge of the front wall 111A of the scanner base 110, and a lower edge of the rear wall 122B of the scanner top 120 contacts an upper edge of the rear wall 111B of the scanner base 110. Each of the rear wall 111B of the scanner base 110 and the rear wall 122B of the scanner top 120 extends in the left-right direction. The rear wall 111B of the scanner base 110 and the rear wall 122B of the scanner top 120 constitute a portion of an exterior surface of a rear side of the main unit 8. The left wall 122L and the right wall 122R of the scanner top 120 depicted in FIG. 4, cover the left wall 111L and the right wall 111R of the scanner base 110 depicted in FIG. 5, respectively, from outside in the left-right direction. The left wall 122L and the right wall 122R each constitute a portion of an exterior surface on left and right sides of the main unit 8, respectively.

The first peripheral wall 111 and the second peripheral wall 122 are an example of a peripheral wall. The rear wall 122B of the second peripheral wall 122 is an example of a particular wall. The first peripheral wall 111 and the second peripheral wall 122 enclosing the bottom wall surface 119 define an accommodation area 100A thereinside. The reading sensor 3S, the carriage 20, the flat cable 50 and a scanning mechanism (not depicted) are accommodated in the accommodation area 100A.

Figure 9:
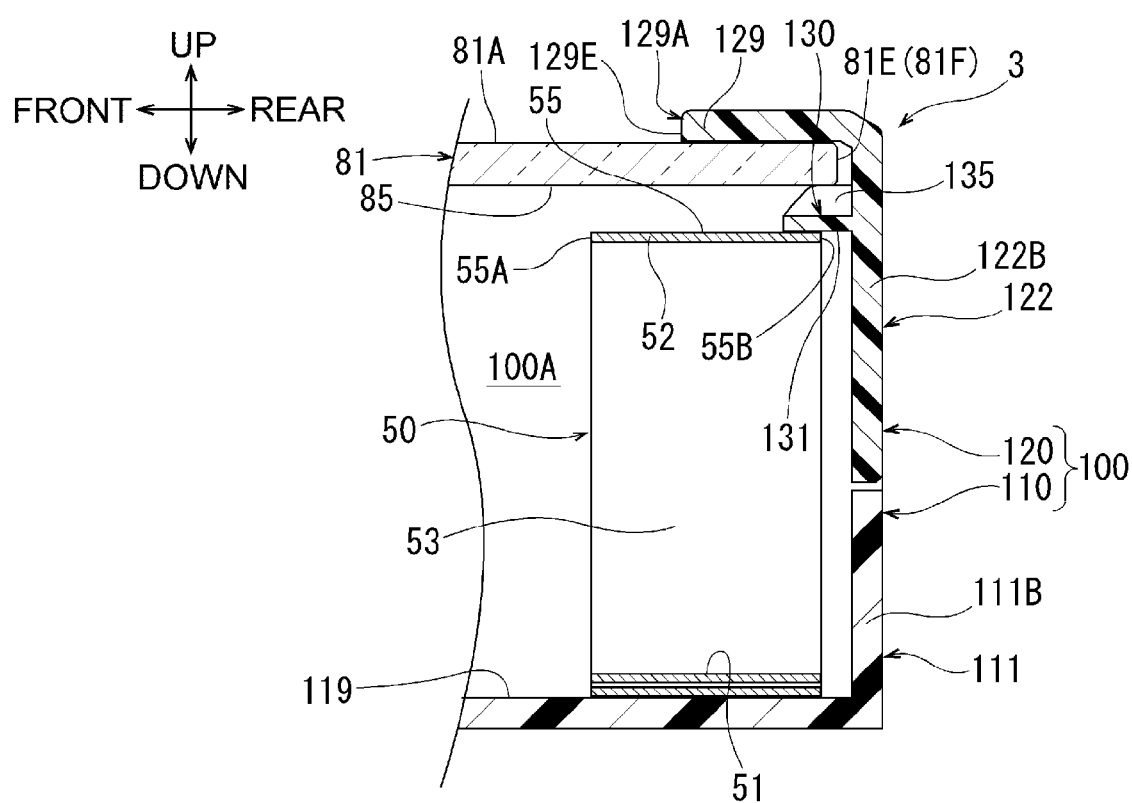
FIG. 9 is a partial sectional view of the scanner housing, taken along a line B-B of FIG. 8B.

As depicted in FIGS. 6 and 9, the peripheral edge portion 81E of the platen glass 81 includes a rear edge portion 81F extending along the rear wall 122B of the scanner top 120. A left portion of the rear edge portion 81F is held between a rear end portion of the frame 129 of the scanner top 120 and protrusions 135 of a restricting portion 130 (described below). The rear edge portion 81F is an example of a particular edge portion.

As depicted in FIG. 6, a front edge portion of the peripheral edge portion 81E of the platen glass 81 is held between the front wall 111A of the scanner base 110 and a front end portion of the frame 129 of the scanner top 120. Although illustration is omitted, a right portion of the rear edge portion 81F is similarly held between a right portion of the rear wall 111B of the scanner base 110 and a right rear portion of the frame 129 of the scanner top 120. Left and right edge portions of the peripheral edge portion 81E of the platen glass 81 are similarly held between the left wall 111L and the right wall 111R of the scanner base 110 and a left end portion and a right end portion of the frame 129 of the scanner top 120, respectively.

The peripheral edge portion 81E of the platen glass 81 is entirely affixed to the frame 129, by double-sided adhesive tape (not depicted). Thus, the platen glass 81 attached to the scanner housing 100 covers the accommodation area 100A from above.

As depicted in FIGS. 3 and 4, the frame 129 has a first opening 129A and a second opening 129B formed thereon. The first opening 129A has a relatively large rectangular shape elongated in the left-right direction. The second opening 129B is located to the left of the first opening 129A. The second opening 129B has a rectangular shape elongated in the front-rear direction.

As depicted in FIG. 3, an upper surface of the platen glass 81 extending substantially horizontally includes a document support surface 81A and a reading surface 81B. The document support surface 81A is a portion of the upper surface of the platen glass 81 exposed from the first opening 129A. The document support surface 81A is configured to support a stationary document from below when the reading unit 3 reads an image on the document. Documents to be read include a sheet of paper, a transparency, and a page of a book. The reading surface 81B is a portion of the upper surface of the platen glass 81 exposed from the second opening 129B. The reading surface 81B is configured to guide documents fed one by one by the feeding unit 4 from below when the reading unit 3 reads images on the documents.

In the illustrative embodiment, an imaged object that is read using the document support surface 81A or that is read while being fed by the feeding unit 4 is referred to as a document.

As depicted in FIGS. 6, 8A-8C, and 9, the platen glass 81 includes a flat surface 85. The flat surface 85 is a lower surface of the platen glass 81 opposite to the document support surface 81A. The flat surface 85 faces the bottom wall surface 119 from above at least inside an inner peripheral edge 129E, defining the first opening 129A, of the frame 129. The flat surface 85 extends substantially horizontally.

As depicted in FIG. 1, the openable unit 9 is pivotally supported about a pivot axis X9 extending in the left-right direction by hinges (not depicted) disposed at upper rear end portions of the main unit 8. When the openable unit 9 is closed as depicted in a solid line FIG. 1, the openable unit 9 covers the document support surface 81A from above. As openable unit 9 pivots about the pivot axis X9 such that a front end portion of the openable unit 9 moves upward and rearward, as depicted by a two-dot chain line in FIG. 1, the document support surface 81A is exposed. With the document support surface 81A being exposed, a user may place a document to be read, on the document support surface 81A.

As depicted in FIGS. 1 and 2, a supply tray 9A is disposed at an upper portion of the openable unit 9 so as to open and close. As depicted in FIG. 2, the feeding unit 4 is disposed in the openable unit 9. The feeding unit 4 is configured to separate a plurality of documents supported by the supply tray 9A that is open, one by one, and feed the documents sequentially along a conveyance path P1.

As depicted in FIG. 5, the guide rail 29 is disposed on the bottom wall surface 119 of the scanner base 110. The guide rail 29 is located at a generally central portion of the bottom wall surface 119 in the front-rear direction, and extends in the left-right direction between near the left wall 111L and the right wall 111R.

As depicted in FIGS. 5, 6 and 8A-8C, the carriage 20 made of resin is elongated in the front-rear direction. The carriage 20 extends in the front-rear direction between the front wall 111A and the rear wall 111B of the scanner base 110. The carriage 20 is coupled to the scanning mechanism (not depicted). The scanning mechanism is a known mechanism including a drive source, a drive pulley, a driven pulley, and a timing belt.

The carriage 20 is configured to reciprocate in the left-right direction above the bottom wall surface 119 while being driven by the scanning mechanism (not depicted) and guided by the guide rail 29. A position of the carriage 20 depicted by a solid line in FIG. 5 and a position of the carriage 20 depicted in FIG. 8A indicate a standby position where the carriage 20 is located between the document support surface 81A and the reading surface 81B. A position of the carriage 20 depicted by a two-dot chain line in FIG. 5 and a position of the carriage 20 depicted in FIG. 8C indicate that the carriage 20 is located rightmost.

As depicted in FIGS. 2, 5, and 8A-8C, the reading sensor 3S is held by the carriage 20 in the accommodation area 100A such that the reading sensor 3S faces the platen glass 81 from below. The reading sensor 3S is a known reading sensor, e.g., a contact image sensor ("CIS") and a charge coupled device ("CCD"). The reading sensor 3S extends in the front-rear direction. The reading sensor 3S has a length in the front-rear direction so as to exceed a width of a document (e.g., a maximum size of a document that the image reading apparatus 1 is configured to read) in the front-rear direction supported on the document support surface 81A.

As the carriage 20 is driven by the scanning mechanism (not depicted), the reading sensor 3S held by the carriage 20 also reciprocates in the left-right direction. As the carriage 20 moves rightward from the standby position depicted in FIG. 8A to a position depicted in FIG. 8C, the reading sensor 3S moves from near a left end of the document support surface 81A toward a right end of the document support surface 81A. FIG. 3 depicts a reading area 3E in which the reading sensor 3S is configured to read an image of a document supported on the document support surface 81A of the platen glass 81. The reading area 3E is defined by the left edge and the rear edge of the inner peripheral edge 129E defining the first opening 129A and a two-dot chain line S1. As the carriage 20 moves leftward from the standby position depicted in FIG. 8A, the reading sensor 3S moves to a fixed reading position (not depicted) in which the reading sensor 3S faces the reading surface 81B from below.

The front-rear direction in which the reading sensor 3S extends is an example of a first direction parallel to a document support surface. The left-right direction in which the carriage 20 reciprocates is an example of a second direction orthogonal to the first direction and parallel to the document support surface. A left end of the bottom wall surface 119 is an example of one end of a bottom wall surface in the second direction. A right end of the bottom wall surface 119 is an example of an opposite end of the bottom wall surface in the second direction. The top-bottom direction is an example of a third direction orthogonal to the document support surface.

As depicted in FIGS. 5-9, the flat cable 50 includes a plurality of insulated wires connected and arranged in a belt shape. The flat cable 50 has flexibility. As depicted in FIGS. 5, 7 and 8A-8C, an end portion 50A of the flat cable 50 is held by the bottom wall surface 119 in the accommodation area 100A. The end portion 50A of the flat cable 50 is disposed adjacent to and in front of a middle portion of the rear wall 111B of the scanner base 110 in the left-right direction. As depicted in FIGS. 8A-8C, an opposite end portion 50B of the flat cable 50 is held by the carriage 20. An end of the flat cable 50 closer to the opposite end portion 50B is electrically connected to the reading sensor 3S via a connector 3C.

The flat cable 50 is turned down at the end portion 50A and extends along the bottom wall surface 119 toward the left end of the bottom wall surface 119. Although illustration is omitted, the flat cable 50 further extends to a controller (not depicted) disposed below the scanner base 110 in the main unit 8 and is electrically connected to the controller.

As depicted in FIGS. 6-9, the flat cable 50 includes a first extending portion 51, a curved portion 53, and a second extending portion 52. The first extending portion 51 is continued from the end portion 50A of the flat cable 50 held by the bottom wall surface 119 and extends toward the left end of the bottom wall surface 119 along the bottom wall surface 119. The curved portion 53 is continued from the first extending portion 51. The curved portion 53 is semi-circularly curved approaching the platen glass 81. The second extending portion 52 is continued from the curved portion 53, and extends toward the right end of the bottom wall surface 119 along the platen glass 81. The second extending portion 52 continues to the opposite end portion 50B of the flat cable 50.

A state of the flat cable 50 depicted in FIG. 6 corresponds to a state of the flat cable 50 depicted in FIG. 8A. A state of the flat cable 50 depicted in FIG. 9 corresponds to states of the flat cable 50 depicted in FIGS. 8B and 8C.

The flat cable 50 has flexibility, so that the curved portion 53 is curved while storing a restoring force. In the flat cable 50, by the restoring force of the curved portion 53, the first extending portion 51 is urged toward the bottom wall surface 119 and the second extending portion 52 is urged toward the platen glass 81.

As depicted in FIGS. 6-9, the flat cable 50 includes a facing surface 55 facing the flat surface 85 of the platen glass 81 from below. The facing surface 55 is an upper surface of the second extending portion 52. As depicted in FIGS. 8A-8C, the flat surface 85 is flat but the facing surface 55 is curved upward when viewed in the front-rear direction. The curved condition of the facing surface 55 changes according to the positions of the carriage 20 in the left-right direction.

As depicted in, for example, FIGS. 3, 6 and 9, the facing surface 55 includes a first edge 55B that is a rear edge of the facing surface 55 and a second edge 55A that is a front edge of the facing surface 55. Each of the first edge 55B and the second edge 55A extends in the left-right direction. The first edge 55B is disposed along the rear wall 122B of the scanner top 120. The second edge 55A overlaps the platen glass 81 in the top-bottom direction inside the inner peripheral edge 129E, defining the first opening 129A, of the frame 129. As depicted in FIG. 3, the second edge 55A is located overlapping the reading area 3E of the reading sensor 3S when viewed in the top-bottom direction.

As depicted in FIGS. 8A, 8B, and 8C in this order, when the carriage 20 moves from the left side to the right side while being driven by the scanning mechanism (not depicted), the second extending portion 52 of the flat cable 50 is pulled by the carriage 20, so that the curved portion 53 moves toward the right edge of the bottom wall surface 119. Accordingly, the first extending portion 51 becomes shorter and the second extending portion 52 becomes longer.

As depicted in FIGS. 8C, 8B and 8A in this order, when the carriage 20 moves from the right side to the left side while being driven by the scanning mechanism (not depicted), the second extending portion 52 of the flat cable 50 is pushed by the carriage 20, so that the curved portion 53 moves toward the left end of the bottom wall surface 119. Accordingly, the first extending portion 51 becomes longer and the second extending portion 52 becomes shorter. Thus, the flat cable 50 follows the reciprocating movement of the carriage 20 and does not get in the way of an image reading operation by the reading sensor 3S.

<Structure of Restricting Portion>

As depicted in FIGS. 3, 4 and 6-9, the rear wall 122B of the scanner top 120 includes the restricting portion 130. The restricting portion 130 is a rib integrally formed with the rear wall 122B. The restricting portion 130 protrudes forwardly and extends in the left-right direction. As depicted in FIG. 6, the restricting portion 130 is located between the frame 129 and the first edge 55B of the facing surface 55 of the flat cable 50 in the top-bottom direction.

In one example, as depicted in, for example, FIGS. 6 and 9, the restricting portion 130 has a generally rectangular cross-sectional shape elongated in the front-rear direction when viewed in the left-right direction. The restricting portion 130 includes a restricting surface 131 disposed at a lower surface thereof. The restricting surface 131 is located below the flat surface 85, e.g., closer to the bottom wall surface 119 than the flat surface 85. An upper surface of the restricting portion 130 is also located below the flat surface 85. The restricting surface 131 extends substantially horizontally, e.g., substantially parallel to the flat surface 85. The restricting surface 131 is located above the first edge 55B of the facing surface 55 of the flat cable 50.

As depicted in FIG. 6, the restricting portion 130 protrudes frontward from the rear wall 122B of the scanner top 120 by a length L130. The length L130 is set such that a front edge of the restricting portion 130 extends beyond the first edge 55B of the facing surface 55 of the flat cable 50. Further, the length L130 is set such that the front edge of the restricting portion 130 does not extend beyond the inner peripheral edge 129E, defining the first opening 129A, of the frame 129.

As depicted in FIG. 8C, a range E1 is a range in which a portion of the facing surface 55, which is curved upward and approaching the flat surface 85, moves in the left-right direction. The restricting surface 131 extends in the left-right direction across the range E1.

As depicted in, for example, FIGS. 6-9, the restricting portion 130 includes a plurality of protrusions 135. The protrusions 135 protrude upward from the upper surface of the restricting portion 130, and are predeterminedly spaced in the left-right direction. A rear edge of each protrusion 135 is connected to the rear wall 122B of the scanner top 120. A distance between an upper edge of each protrusion 135 and the frame 129 in the top-bottom direction is substantially the same as the thickness of the platen glass 81. As depicted in FIGS. 6 and 8A-8C, a left portion of the rear edge portion 81F of the platen glass 81 is held by the frame 129 and the restricting portion 130 by inserting the left portion of the rear edge portion 81F of the platen glass 81 between the frame 129 and the upper edge of each protrusion 135.

<Image Reading Operation>

When the image reading apparatus 1 reads a document supported on the document support surface 81A, the scanning mechanism (not depicted) is operated to move the reading sensor 3S mounted on the carriage 20 from left to right in the reading unit 3 as depicted in FIG. 2. Accordingly, the reading sensor 3S reads an image on the document supported on the document support surface 81A. Thereafter, the scanning mechanism (not depicted) moves the reading sensor 3S that has finished reading the document from right to left in the reading unit 3, so that the reading sensor 3S is located at the standby position depicted in FIG. 8A.

When the image reading apparatus 1 successively reads images on a plurality of documents supported by the supply tray 9A, the scanning mechanism (not depicted) is operated to move the reading sensor 3S mounted on the carriage 20 to a fixed reading position on the left end of the reading unit 3. As the feeding unit 4 sequentially feeds the documents supported by the supply tray 9A along the conveyance path P1, the documents pass over the reading sensor 3S located at the fixed reading position. The reading sensor 3S reads an image on a document passing over the reading sensor 3S.

<Effects>

Figure 7:
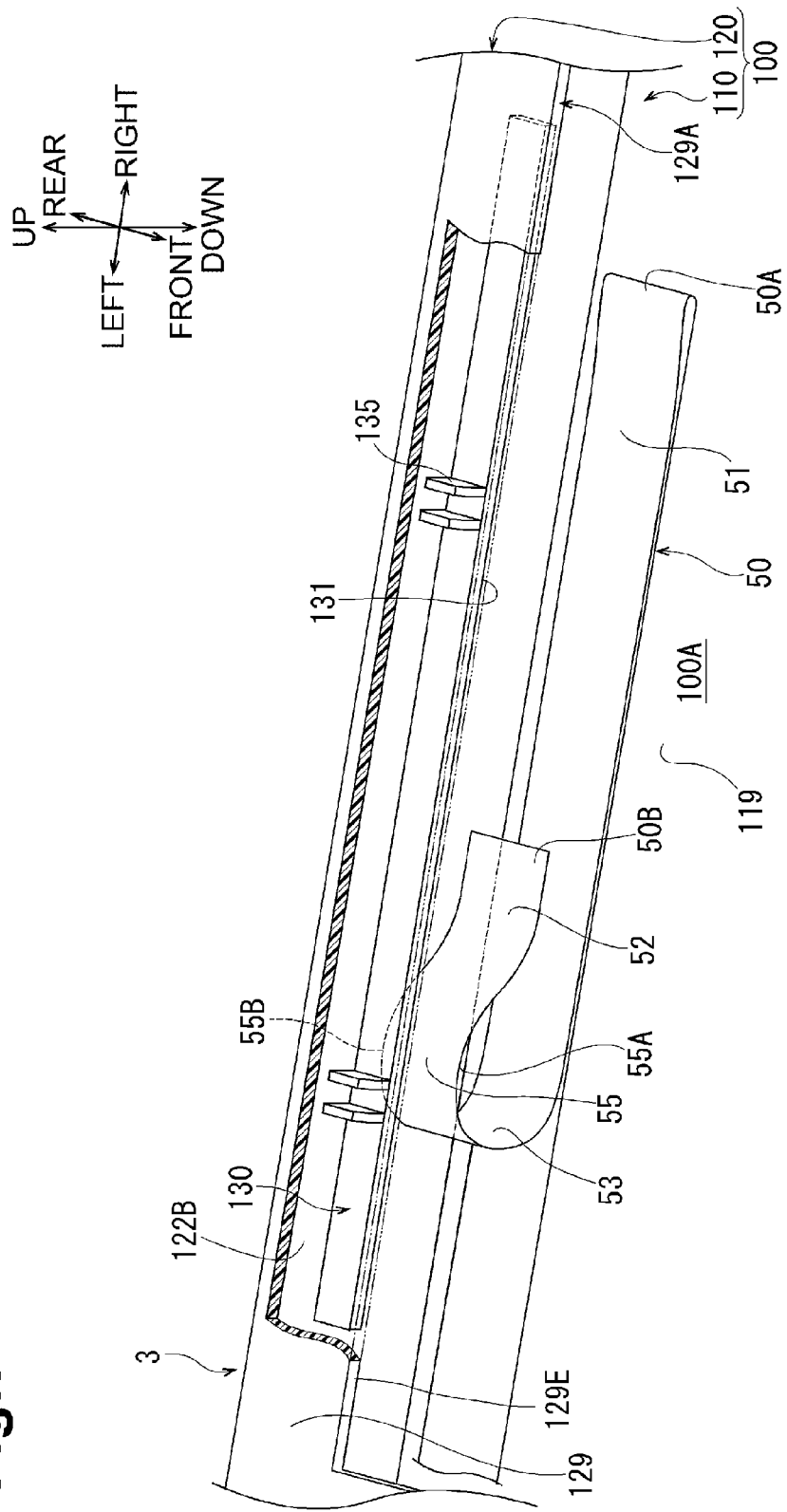
FIG. 7 is a partial perspective view of the scanner housing, the flat cable, and a restricting portion.

In the image reading apparatus 1 according to the illustrative embodiment, as depicted in, for example, FIGS. 7 and 9, the first edge 55B at the rear edge of the facing surface 55 of the flat cable 50 is disposed along the rear wall 122B of the scanner top 120. The second edge 55A at the front edge of the facing surface 55 is disposed overlapping the platen glass 81 inside the inner peripheral edge 129E, defining the first opening 129A, of the frame 129 when viewed in the top-bottom direction, as depicted in FIG. 3. Therefore, in the image reading apparatus 1, a dimension of a portion of the frame 129 closer to the rear wall 122B of the scanner top 120, e.g., a rear portion of the frame 129, may be reduced with respect to the front-rear direction.

Figure 8:
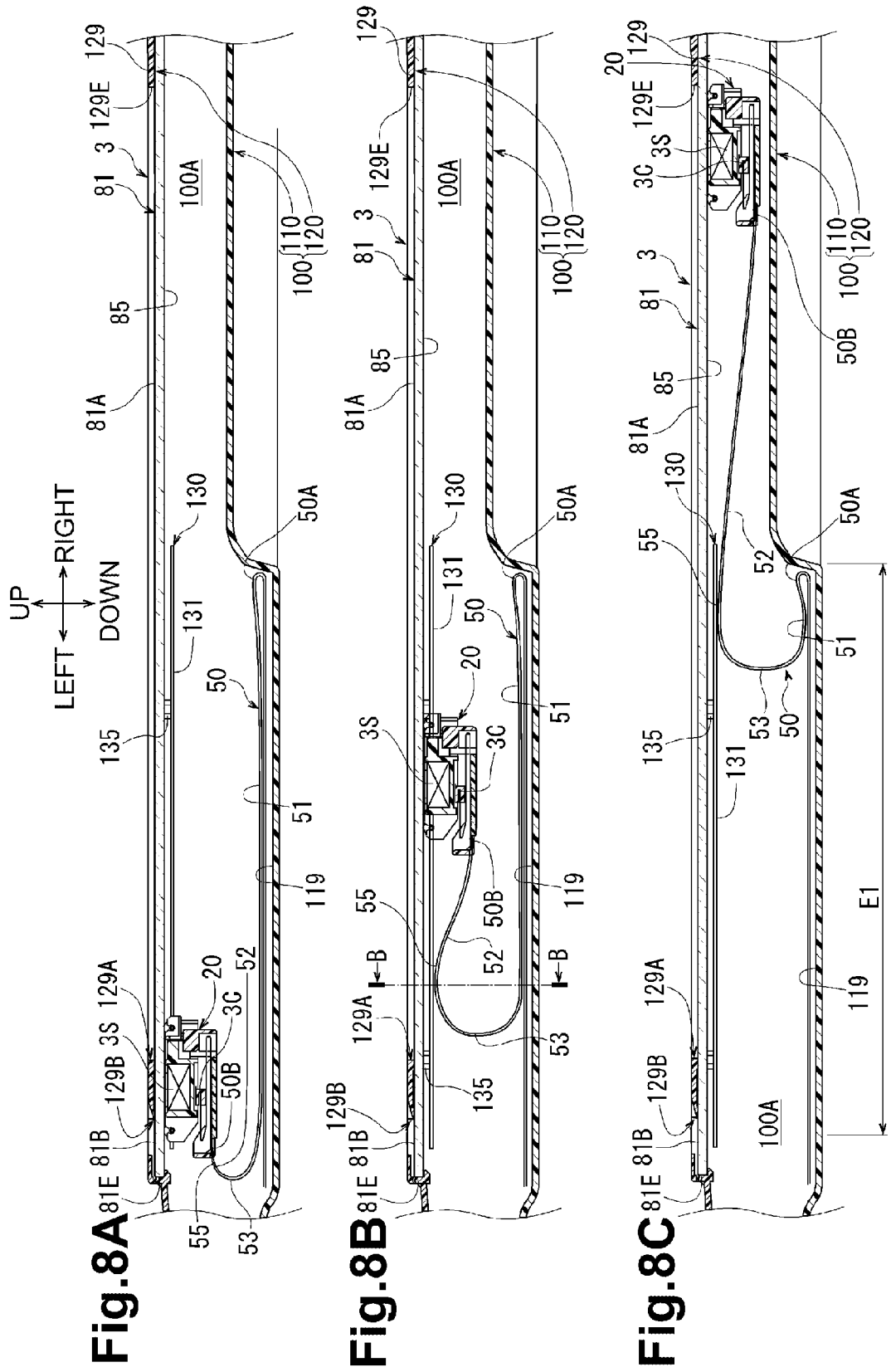
FIGS. 8A-8C are partial sectional views depicting effects of the restricting portion on the flat cable that follows the movable member.

In the image reading apparatus 1, the rear wall 122B of the scanner top 120 includes the restricting portion 130, as depicted in, for example, FIGS. 7-9. The restricting portion 130 is located between the frame 129 and the first edge 55B of the facing surface 55 of the flat cable 50 and protrudes forward. The restricting portion 130 includes the restricting surface 131. The restricting surface 131 is located below the flat surface 85 of the platen glass 81, e.g., closer to the bottom wall surface 119 than the flat surface 85, and extends substantially horizontally, e.g., substantially parallel to the flat surface 85. The restricting portion 130 as structured above is configured to restrict the facing surface 55 of the flat cable 50 from contacting the platen glass by contacting the flat cable 50. More specifically, even when a position of the facing surface 55 changes as the flat cable 50 follows the reciprocating movement of the carriage 20, as depicted in FIG. 8A-8C, the restricting surface 131 contacts an outer portion, closer to the first edge 55B than to the second edge 55A, of the facing surface 55 of the flat cable 50, so as to prevent the facing surface 55 from contacting the flat surface 85 of the platen glass 81, as depicted in FIG. 9. Therefore, an inner portion, closer to the second edge 55A than to the first edge 55B, of the facing surface 55 may be difficult to contact the flat surface 85 of the platen glass 81 inside the inner peripheral edge 129E, defining the first opening 129A, of the frame 129. Consequently, dust adhered to the inner portion of the facing surface 55 may be difficult to adhere to the flat surface 85 as contaminants.

Therefore, in the image reading apparatus 1 according to the illustrative embodiment, reduction of the size of the image reading apparatus 1 in the front-rear direction may be realized, and reduction in quality of appearance of the image reading apparatus 1 due to dust on the platen glass 81 may be prevented.

In the image reading apparatus 1, the flat cable 50 includes the first extending portion 51, the curved portion 53, and the second extending portion 52. The facing surface 55 is a surface of the second extending portion 52 facing the flat surface 85. With this structure, in the image reading apparatus 1, the facing surface 55 readily approaches the flat surface 85 by a restoring force of the curved portion 53 when the flat cable 50 follows the reciprocating movement of the carriage 20, as depicted in, for example, FIGS. 8A-8C. As depicted in FIG. 8C, the restricting surface 131 extends in the left-right direction across the range E1 in which a portion of the facing surface 55 approaching the flat surface 85 moves in the left-right direction. With this structure, the restricting surface 131 is configured to contact a portion of the facing surface 55 closer to the first edge 55B always from above, so that movement of the facing surface 55 may be reliably regulated so as not to approach the flat surface 85 of the platen glass 81.

Further, in the image reading apparatus 1, as depicted in, for example, FIGS. 4-6, the scanner housing 100 includes the scanner base 110 and the scanner top 120. The rear wall 122B of the scanner top 120 includes the restricting portion 130. Generally, the scanner top 120 may be shaped simpler than the scanner base 110 to which the carriage 20, the flat cable 50, and the scanning mechanism (not depicted) are mounted. Therefore, the restricting portion 130 may be readily added to the rear wall 122B constituting a portion of the second peripheral wall 122 of the scanner top 120.

In the image reading apparatus 1, as depicted in, for example, FIG. 6, a portion of the rear edge portion 81F of the platen glass 81 is held by the frame 129 and the protrusion 135 of the restricting portion 130. For example, in the image reading apparatus 1, the restricting portion 130 serves to hold the platen glass 81, so that the scanner housing 100 may be simplified.

Further, in the image reading apparatus 1, as depicted in FIG. 6, the restricting portion 130 protrudes frontward from the rear wall 122B of the scanner top 120 by the length L130. The length L130 is set such that the restricting portion 130 does not extend beyond the inner peripheral edge 129E of the frame 129. Accordingly, in the image reading apparatus 1, the restricting portion 130 is entirely covered by the frame 129 when viewed in the top-bottom direction, and the restricting portion 130 does not protrude beyond the inner peripheral edge 129E, defining the first opening 129A, of the frame 129 toward the reading area 3E. Therefore, when a user looks down the document support surface 81A from above, the user does not visually recognize the restricting portion 130, via the document support surface 81A. Therefore, deterioration of the appearance quality of the image reading apparatus 1 due to the restricting portion 130 may be reduced.

In the image reading apparatus 1, as depicted in FIG. 3, the second edge 55A of the facing surface 55 of the flat cable 50 is located overlapping the reading area 3E of the reading sensor 3S when viewed in the top-bottom direction. With this structure, reduction of a size of the image reading apparatus 1 in the front-rear direction may further be realized. With the restricting portion 130, dust adhering to a portion of the facing surface 55 closer to the second edge 55A may be difficult to adhere, as contaminants, to an area of the flat surface 85 of the platen glass 81 corresponding to the reading area 3E. Therefore, reduction in reading quality when the reading sensor 3S reads an image on a document may be prevented or reduced.

While the disclosure has been described in detail with reference to the specific embodiment, it is to be understood that the disclosure is not limited thereto. Various changes, arrangements and modifications may be applied without departing from the spirit and scope of the disclosure.

(First Modification)

Figure 10:
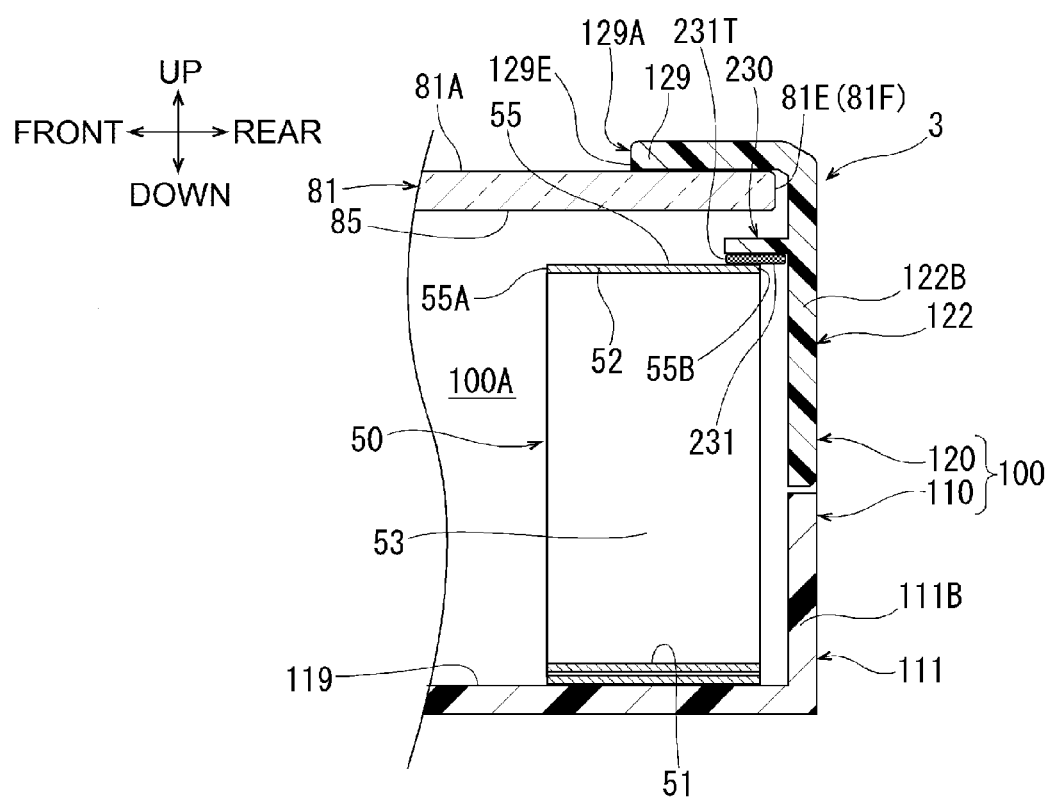
FIG. 10 is a partial sectional view, similar to FIG. 9, depicting a restricting portion according to a modification of the illustrative embodiment.

FIG. 10 depicts a restricting portion 230, which is a modification of the restricting portion 130 according to the first illustrative embodiment.

In the above-described illustrative embodiment, the restricting portion 130 includes the protrusions 135. The restricting portion 230 according to the first modification does not include the protrusions 135. The rear edge portion 81F of the platen glass 81 is not be held by the frame 129 and the restricting portion 230. The rear edge portion 81F of the platen glass 81 is spaced apart from the restricting portion 230 in the top-bottom direction.

In the above-described embodiment, the restricting portion 130 includes the restricting surface 131 disposed at a lower surface thereof. In the restricting portion 230 according to the first modification, a tape piece 231T having a low frictional resistance to the facing surface 55 is affixed to a lower surface of the restricting portion 230. A lower surface of the tape piece 231T serves as a restricting surface 231. In other words, the restricting surface 231 is a low frictional surface having a low frictional resistance to the facing surface 55. The restricting surface 231 may be formed by coating or grinding a lower surface of the restricting portion 230.

Reduction of a size, in the front-rear direction, of an image reading apparatus including the restricting portion 230 may be realized and deterioration of the appearance quality of the image reading apparatus may be prevented or reduced, similar to the image reading apparatus 1 according to the above-described illustrative embodiment. The facing surface 55 of the flat cable 50 may smoothly change its position without being caught by the restricting surface 231 of the restricting portion 230. Therefore, the flat cable 50 may follow the reciprocating movement of the carriage 20 favorably.

(Second Modification)

Figure 11:
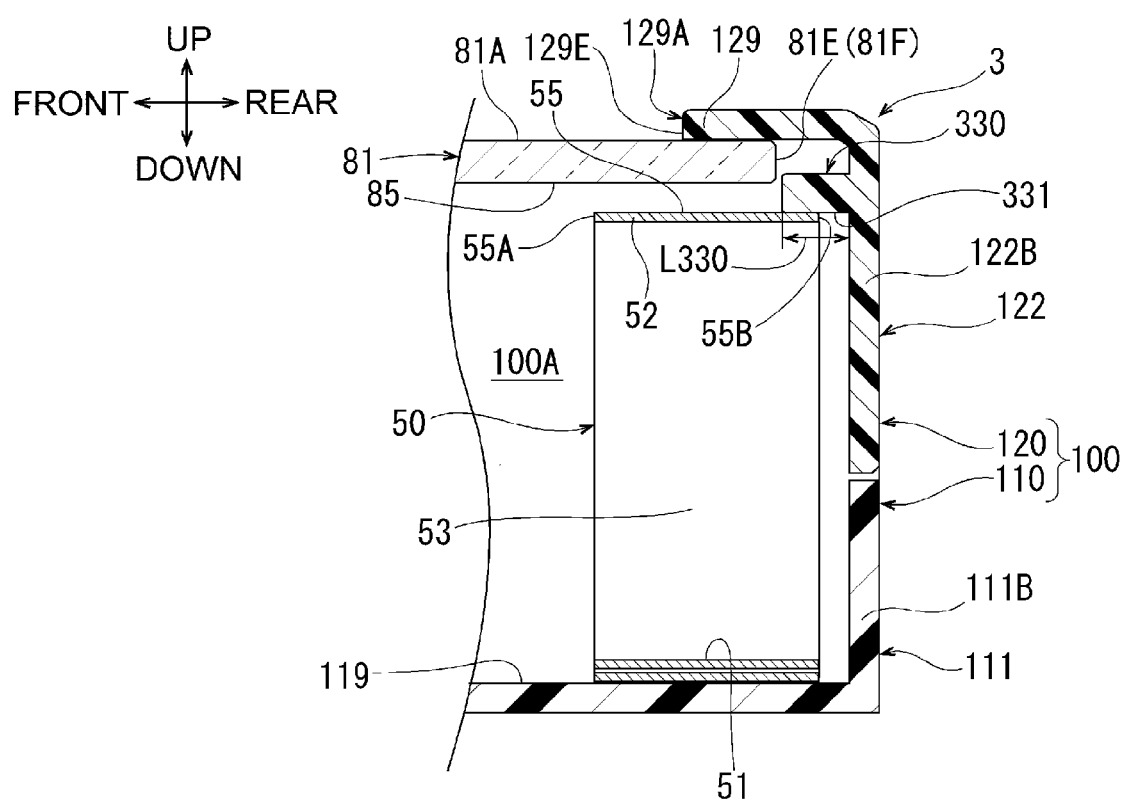
FIG. 11 is a partial sectional view, similar to FIG. 9, depicting a restricting portion according to another modification of the illustrative embodiment.

FIG. 11 depicts a restricting portion 330, which is another modification of the restricting portion 130 according to the above-described illustrative embodiment.

In the above-described illustrative embodiment, the restricting portion 130 includes the protrusions 135. The restricting portion 330 according to the second modification does not include the protrusions 135. The restricting portion 330 protrudes frontward from the rear wall 122B of the scanner top 120 by a length L330. The length L330 is set such that a front edge of the restricting portion 330 extends beyond the first edge 55B of the facing surface 55 of the flat cable 50. Further, the length L330 is set such that the front edge of the restricting portion 330 does not extend beyond the rear edge portion 81F of the platen glass 81.

The restricting portion 330 includes a restricting surface 331 disposed at a lower surface thereof, similar to the restricting surface 131 of the above-described illustrative embodiment. An upper surface of the restricting portion 330 is located above the flat surface 85 of the platen glass 81. This structure may be effective to reduce the size of an image reading apparatus in the top-bottom direction.

Reduction of a size, in the front-rear direction, of an image reading apparatus including the restricting portion 330 may be realized and deterioration of the appearance quality of the imager reading apparatus may be prevented or reduced, similar to the image reading apparatus 1 according to the above-described illustrative embodiment.

The disclosure may be applied to an image reading apparatus and a multi-functional apparatus.

What is claimed is:

1. An image reading apparatus comprising:
    a scanner housing including a bottom wall surface, a frame spaced from and extending substantially parallel to the bottom wall surface, and a peripheral wall protruding from both of the bottom wall surface and the frame, the frame having an inner peripheral edge, the peripheral wall defining, with the bottom wall surface and the frame, an accommodation area within the scanner housing;
    a document support member supported by the scanner housing such that the document support member covers the accommodation area, the document support member having a flat surface and a document support surface opposite to the flat surface, the flat surface facing the bottom wall surface of the scanner housing at least inside the inner peripheral edge of the frame, the document support member being configured to support a document on the document support surface;
    a reader disposed in the accommodation area defined within the scanner housing and extending in a first direction parallel to the document support surface, the reader being configured to read an image of a document supported on the document support surface;
    a movable member holding the reader and configured to reciprocate in the accommodation area defined within the scanner housing in a second direction orthogonal to the first direction and parallel to the document support surface; and
    a flat cable connected to the reader at one end, the flat cable having a facing surface facing the flat surface of the document support member,
    wherein the peripheral wall of the scanner housing includes a particular wall extending in the second direction and a third direction orthogonal to the document support surface and defining one side of the accommodation area,
    wherein the facing surface of the flat cable has a first edge and a second edge opposite to the first edge in the first direction, the first edge being disposed along the particular wall extending in the second direction, the second edge being located overlapping the document support member at a position closer to a center of the document support member than a first segment of the inner peripheral edge of the frame of the scanner housing when viewed in the third direction, the first segment being closer to the particular wall than a second segment opposite the first segment in the first direction,
    wherein the particular wall of the peripheral wall of the scanner housing includes a restricting portion protruding from the particular wall in the first direction, the restricting portion being located between the frame of the scanner housing and the first edge of the facing surface of the flat cable in the third direction such that the restricting portion restricts the facing surface of the flat cable from contacting the flat surface of the document support member by contacting an outer portion, closer to the first edge than to the second edge, of the facing surface of the flat cable, and
    wherein the restricting portion protruding from the particular wall in the first direction includes a restricting surface located closer to the bottom wall surface of the scanner housing than the flat surface of the document support member, the restricting surface extending substantially parallel to the flat surface of the document support member such that, when the movable member reciprocates in the second direction, the outer portion of the facing surface of the flat cable contacts the restricting surface.

2. The image reading apparatus according to claim 1, wherein the flat cable includes
    a first extending portion continued from an end portion held by the bottom wall surface of the scanner housing and extending toward one end of the bottom wall surface in the second direction,
    a curved portion continued from the first extending portion, the curved portion being curved approaching the document support member, and
    a second extending portion continued from the curved portion and extending toward an opposite end of the bottom wall surface in the second direction,
wherein the facing surface of the flat cable facing the flat surface of the document support member is a surface of the second extending portion, and
wherein the restricting surface of the restricting portion extends in the second direction across a range in which a portion of the facing surface of the flat cable approaching the flat surface of the document support member moves in the second direction.

3. The image reading apparatus according to claim 1, wherein the scanner housing includes
a scanner base including the bottom wall surface and a first peripheral wall defining the peripheral wall extending from the bottom wall surface, and
a scanner top including the frame and a second peripheral wall defining the peripheral wall extending from the frame, and
wherein the second peripheral wall includes the particular wall.

4. The image reading apparatus according to claim 1, wherein the document support member has a particular edge portion extending along the particular wall of the peripheral wall of the scanner housing, the particular edge portion being covered on the document support surface by the frame of the scanner housing, and
wherein at least a part of the particular edge portion of the document support member is held by the frame and the restricting portion.

5. The image reading apparatus according to claim 4, wherein the restricting portion has a protrusion protruding upward from an upper surface of the restricting portion opposite to the restricting surface, the protrusion supporting the at least a part of the particular edge portion of the document support member.

6. The image reading apparatus according to claim 1, wherein the restricting surface is a low frictional surface having a low frictional resistance to the facing surface of the flat cable.

7. The image reading apparatus according to claim 1, wherein the restricting portion protrudes in the first direction from the particular wall by a length being set such that the restricting portion does not extend beyond the inner peripheral edge of the frame of the scanner housing.

8. The image reading apparatus according to claim 7, wherein the length by which the restricting portion protrudes in the first direction from the particular wall is set such that the restricting portion does not extend in the first direction beyond a particular edge portion of the document support member extending along the particular wall of the peripheral wall of the scanner housing.

9. The image reading apparatus according to claim 1, wherein an upper surface of the restricting portion is located above the flat surface of the document support member.

10. The image reading apparatus according to claim 1, wherein the second edge of the facing surface of the flat cable is located, when viewed in the third direction, overlapping a reading area in which the reader is configured to read an image of a document supported on the document support surface.

11. The image reading apparatus according to claim 1, wherein the document support member includes a platen glass.

12. The image reading apparatus according to claim 1, wherein the document support member has a particular edge portion extending along the particular wall of the peripheral wall of the scanner housing, the particular edge portion being spaced apart from the restricting portion in the third direction.

13. An image reading apparatus comprising:
a glass which is flat;
a scanner housing holding the glass, the scanner housing including:
a frame extending substantially parallel to the glass and having an inner peripheral edge;
a particular surface spaced apart from and extending substantially parallel to the frame; and
a peripheral wall defining an accommodation area;
a reader disposed in the accommodation area of the scanner housing and extending in a first direction parallel to the glass, the reader being configured to read an image of a document on the glass;
a movable member holding the reader and configured to reciprocate in the accommodation area of the scanner housing in a second direction orthogonal to the first direction and parallel to the glass; and
a flat cable connected to the reader at one end, the flat cable having a facing surface facing the glass,
wherein the peripheral wall of the scanner housing includes a particular wall extending in the second direction and a third direction orthogonal to the glass and defining one side of the accommodation area,
wherein the facing surface of the flat cable has a first edge and a second edge opposite to the first edge in the first direction, the first edge being disposed along the particular wall extending in the second direction, the second edge being located overlapping the glass at a position closer to a center of the glass than a first segment of the inner peripheral edge of the frame of the scanner housing when viewed in the third direction, the first segment being closer to the particular wall than a second segment opposite to the first segment in the first direction,
wherein the particular wall of the peripheral wall of the scanner housing includes a restricting portion, the restricting portion protruding from the particular wall in the first direction such that the restricting portion restricts the facing surface of the flat cable from contacting the glass by contacting an outer portion, closer to the first edge than to the second edge, of the facing surface of the flat cable.

14. The image reading apparatus according to claim 13, wherein the restricting portion extends in the second direction.

15. The image reading apparatus according to claim 13, wherein the restricting portion includes a restricting surface extending substantially parallel to the glass such that, when the movable member reciprocates in the second direction, the facing surface of the flat cable contacts the restricting surface.

16. The image reading apparatus according to claim 13, wherein the movable member is configured to reciprocate in the second direction under the glass.

17. The image reading apparatus according to claim 13, wherein the glass has a particular edge portion extending along the particular wall of the peripheral wall of the scanner housing, the particular edge portion being covered by the frame of the scanner housing, and
wherein at least a part of the particular edge portion is held by the frame and the restricting portion.

18. The image reading apparatus according to claim 17, wherein the restricting portion has a protrusion protruding toward the glass, the protrusion supporting the at least a part of the particular edge portion of the glass.

19. The image reading apparatus according to claim 13, wherein the second edge of the facing surface of the flat cable is located, when viewed in the third direction, overlapping a reading area in which the reader is configured to read an image of a document on the glass.

* * * * *